United States Patent
Draper et al.

(10) Patent No.: US 6,560,961 B2
(45) Date of Patent: May 13, 2003

(54) STEERING SYSTEM WITH ABILITY TO STOP STEERING WHEEL ROTATION

(75) Inventors: Don R. Draper, Chanhassen, MN (US); Douglas R. Gilbert, Shakopee, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/954,489

(22) Filed: Sep. 18, 2001

(65) Prior Publication Data

US 2003/0051471 A1 Mar. 20, 2003

(51) Int. Cl.[7] ............................................. F16D 13/02
(52) U.S. Cl. ........................ 60/384; 60/387; 60/422
(58) Field of Search ........................... 60/384, 387, 422; 91/516

(56) References Cited

U.S. PATENT DOCUMENTS

| | | | |
|---|---|---|---|
| 5,020,618 A | * | 6/1991 | Nagao .......................... 180/403 |
| 5,215,158 A | * | 6/1993 | Pedersen ...................... 180/403 |
| 5,275,251 A | * | 1/1994 | Thomsen et al. ............ 180/422 |
| 5,960,694 A | | 10/1999 | Thomas et al. ............ 91/363 R |
| 6,076,349 A | | 6/2000 | Stephenson et al. .......... 60/384 |

* cited by examiner

Primary Examiner—Edward K. Look
Assistant Examiner—Igor Kershteyn
(74) Attorney, Agent, or Firm—L. J. Kasper

(57) ABSTRACT

A full fluid-linked steering system includes a fluid pump (11), a fluid controller (19), a steering actuator (17), an electro-hydraulic compensation valve (21), and a vehicle microprocessor (23). Downstream of the fluid pump (11) is a load sensing priority flow control valve (15) having both a controlled flow outlet port (CF) and an excess flow outlet port (EF). The excess flow outlet port (EF) communicates with an inlet port (35) of the fluid controller (19), while the controlled flow outlet port (CF) communicates with a fluid inlet (63) of the compensation valve (21). As a result, when the steering actuator (17) is at the end of its travel, pressure will be communicated only through the compensation valve (21), and the operator will be unable to turn the steering wheel further in the same direction.

9 Claims, 1 Drawing Sheet

STEERING SYSTEM WITH ABILITY TO STOP STEERING WHEEL ROTATION

BACKGROUND OF THE DISCLOSURE

The present invention relates to hydrostatic power steering systems of the type used to control the flow of fluid from a source of pressurized fluid to a vehicle steering device, such as a cylinder or rotary motor.

A typical hydrostatic power steering system includes a fluid controller of the type having a housing, which defines various fluid ports, and further includes a fluid meter and valving, operable in response to an input, such as the rotation of the vehicle steering wheel. The typical fluid controller also includes an arrangement for imparting follow-up movement to the valving in response to the flow of fluid through the controller valving and the fluid meter to the steering device. The flow of fluid through the controller valving is proportional to the rate at which the steering wheel is rotated.

Steering systems and fluid controllers of the type to which the present invention relates are illustrated and described further in U.S. Pat. No. 3,801,239, assigned to the assignee of the present invention and incorporated herein by reference. The fluid controller of the cited patent was developed in response to a problem which has been referred to as "travel limit slip". When the steering cylinder attached to the steered wheels of the vehicle reaches the end of its stroke, or hits a mechanical stop, the steered wheels have reached the end of their travel. However, because of possible leakage out of the fluid meter and valving of the fluid controller, continued application of turning force to the steering wheel by the vehicle operator may result in the steering wheel continuing to turn, although typically at a substantially slower rate. The rate of steering wheel rotation in this condition (i.e., against the "stops") is known as "travel limit slip rate" (TLSR) and is measured in revolutions of the steering wheel per minute.

Those skilled in the art will understand that the above explanation also applies to power steering systems in which the fluid pressure operated device is not a linear steering cylinder, but instead, is a rotary fluid motor, and the invention illustrated and described herein will be considered to apply equally, whether the vehicle steering device is a linear cylinder or a rotary motor.

An attempt to overcome the travel limit slip problem, or at least reduce the TLSR, was illustrated and described in U.S. Pat. No. 5,136,844, also assigned to the assignee of the present invention and incorporated herein by reference. The fluid controller of the cited '844 patent is of the type referred to as having a "plugged star", i.e., the gerotor (fluid meter) star receives within a counterbore at its rearward face a plug member. Fluid pressure is communicated to the region adjacent the plug, whenever the controller valving approaches its maximum displacement position, thus biasing the opposite end of the gerotor star into frictional engagement with an adjacent housing surface, and preventing further rotation of the meter and the steering wheel. Although the fluid controller illustrated and described in the cited '844 has been generally successful in reducing the TLSR, the invention of the '844 patent does involve a substantial redesign of the fluid controller. For example, the valving must be modified, and additional fluid passages provided in both the housing and the endcap, in addition to possible modification of the gerotor star to accommodate the plug.

Another attempt to overcome the travel limit slip problem, and substantially reduce the TLSR, was illustrated and described in U.S. Pat. No. 5,960,694, also assigned to the assignee of the present invention and incorporated herein by reference. In the steering system of the cited '694 patent, as the steering device reaches the end of its travel, the system control logic generates an appropriate command signal to close a pressure reducing-relieving valve and to open a proportional electromagnetic valve. Fluid pressure increases upstream of the electromagnetic valve, which is then communicated through the valve into the conduit between the fluid controller and the steering device, thus preventing any further rotation of the fluid controller in response to an attempt to turn the steering wheel, thus eliminating travel limit slip.

Although the overall functioning and performance of the steering system of the cited '694 patent was acceptable, this particular solution to the travel limit slip problem does require extra system logic and extra valves which perform no function, other than to minimize the TLSR.

Certain hydrostatic power steering systems now available are of the type referred to as "knob control" systems, in which there is typically a steered wheel position sensor, and a steering wheel position sensor. Also, such systems generally include valving to port fluid to or from either the high pressure or low pressure side of the system, as a way of compensating for leakage, etc. As a result, the steered wheels are kept proportionately aligned with (in "registry" with) the "knob" on the steering wheel, as is generally considered desirable by vehicle operators; thus the term "knob control".

On a knob control steering system, the valving which ports fluid typically comprises a pair of electrically controlled auxiliary (compensation) valves, with the electrical control signal to the valves being generated in response to the calculation of an error signal. The error signal is calculated to reflect any deviation of the steered wheels from the position commanded by the position of the steering wheel.

BRIEF SUMMARY OF THE INVENTION

Accordingly, it is an object of the present invention to provide an improved hydrostatic (full fluid-linked) power steering system, and an improved fluid controller therefore, which can substantially eliminate travel limit slip.

It is a more specific object of the present invention to provide an improved fluid controller which can accomplish the above-stated object without the need for additional valving and control logic having no other function than to deal with the travel limit slip problem.

It is another object of the present invention to provide such an improved steering system which actively opposes any effort by the vehicle operator to steer "past the stops".

The above and other objects of the invention are accomplished by the provision of a full fluid-linked steering system adapted to provide input movement to a pair of steered wheels of a vehicle, in response to manual input to a steering member, said steering system comprising a source of pressurized fluid, a fluid controller, and a fluid pressure operated steering actuator adapted to be operably associated with the pair of steered wheels to provide the input movement thereto in response to manual input to the steering member. The fluid controller defines an inlet port in fluid communication with the source of pressurized fluid, and a control port in fluid communication with the steering actuator. The fluid controller further includes a fluid meter operable to measure fluid flow through the fluid meter, and valve means and means biasing the valve means toward a neutral position. The steering system further comprises compensation valve means in fluid communication with the source of fluid and in fluid communication with the steering actuator, and including valving moveable in response to an external input signal to permit fluid communication between the source and the steering actuator. A load sensing priority flow control valve has an inlet connected to the source of fluid, a control flow outlet port, and an excess flow outlet port.

The improved steering system is characterized by the compensation valve means including a fluid inlet in direct fluid communication with the control flow outlet port of the priority flow control valve. The inlet port of the fluid controller is in direct fluid communication with the excess flow outlet port of the priority flow control valve.

In accordance with a further aspect of the invention, when the fluid pressure operated steering actuator is at the end of its travel, the load sensing priority flow control valve is shifted to a position in which all flow is from the control flow outlet port, through the compensation valve means, and into the conduit between the fluid controller and the steering actuator. This increased pressure downstream of the fluid controller resists the pressure resulting from the torque applied by the operator through the steering wheel and thus to the fluid meter in the fluid controller, such that the operator cannot turn the steering wheel further in the same direction.

DETAILED DESCRIPTION OF THE PREFERRED EMBODIMENT

Figure 1:
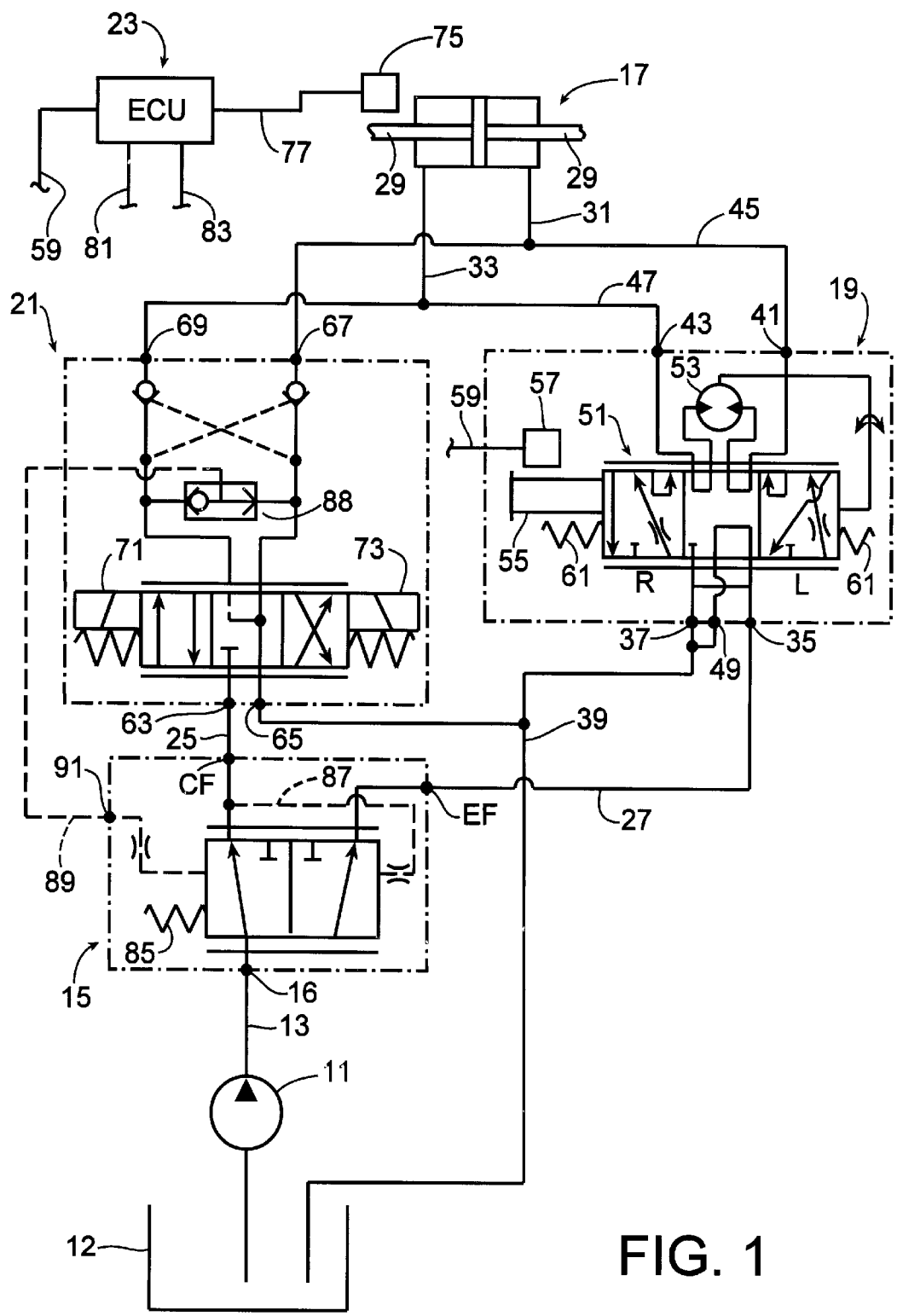
FIG. 1 is a hydraulic schematic of a hydrostatic power steering system made in accordance with the present invention.

Referring now to the drawings, which are not intended to limit the invention, FIG. 1 is a hydraulic schematic of a hydrostatic (full fluid-linked) power steering system made in accordance with the present invention. The system includes a fluid pump 11 which has its inlet connected to a system reservoir 12. The outlet of the pump 11 is in communication by means of a conduit 13 with the inlet of a load sensing priority flow control valve, generally designated 15, of the type illustrated and described in U.S. Pat. No. 3,455,210, assigned to the assignee of the present invention and incorporated herein by reference. The pressure output of the fluid pump 11 would typically be limited by a pressure relief valve (not shown herein), such that any pressure in excess of a predetermined maximum is simply communicated back to the system reservoir 12.

The remainder of the hydrostatic power steering system may be viewed as comprising a plurality of subsystems including a steering actuator 17; a fluid controller, also referred to as a steering control unit (SCU), generally designated 19; an electro-hydraulic control (EHC) valve assembly, generally designated 21; and a vehicle microprocessor (ECU), generally designated 23.

It should be noted that the power steering system shown in FIG. 1 is very similar to that shown in U.S. Pat. No. 6,076,349, assigned to the assignee of the present invention and incorporated herein by reference. A general understanding of the operation of the system may be gained by reference to the cited '349 patent, and although there are some relatively minor differences in the system shown herein in FIG. 1, the primary difference from the cited '349 patent is that which will be described in connection with a description of the present invention.

As is well know to those skilled in the load sensing control art, the priority valve 15 has an inlet 16, a "CF" (controlled flow or priority flow) outlet, having connected thereto a conduit 25, and an "EF" (excess flow) outlet, having connected thereto a conduit 27. As is well know to those skilled in the load sensing and steering arts, and as is shown in the cited '349 patent, the fluid controller which is primarily responsible for accomplishing steering of the vehicle has always been connected to the CF port of the priority valve, while any other hydraulic functions present in the system have been connected to the EF port of the priority valve. As may be seen in FIG. 1, such is not the case herein, which is an important aspect of the invention, as will be described in greater detail subsequently.

In the subject embodiment, and by way of example only, the steering actuator 17 is shown schematically as a linear cylinder having a pair of output rods 29, which would typically be mechanically coupled, such as by means of a drag link or a Pitman arm to provide the actual mechanical input to the pair of steered wheels (not shown herein). It should be understood by those skilled in the art that the particular type of actuator 17 which is utilized in the system of the present invention, and the manner in which it is used to provide a steering input to the steered wheels, are not essential features of the invention. Connected to the opposite sides of the steering actuator 17 are conduits 31 and 33, with pressurized fluid in the conduit 31 effecting a right turn of the vehicle, and pressurized fluid in conduit 33 effecting a left turn of the vehicle.

The fluid controller 19 includes an inlet port 35 connected to the conduit 27, and a return port 37 connected to a conduit 39, by means of which fluid is returned to the system reservoir 12. The SCU 19 also includes a pair of control (cylinder) ports 41 and 43 which are connected by means of conduits 45 and 47, respectively to the conduits 31 and 33, respectively, leading to the steering actuator 17.

It is one feature of the present invention that the SCU 19 is not of a load sensing type of fluid controller, but instead, is an open-center fluid controller, and may be of the "power beyond" type, as that term is well understood in the steering art. In an open-center SCU, steering torque (to turn the steering wheel) is proportional to steering load on the steered wheels, which is desirable for the type of steering system shown in FIG. 1. Thus, the SCU 19 includes a power beyond port 49, but in the system of the present invention, instead of the power beyond port 49 being connected to a downstream auxiliary type hydraulic function, it is preferably connected to the conduit 39 such that flow out of the port 49 flows to the system reservoir 12.

The SCU 19 includes controller valving, generally designated 51 which has a centered or neutral position, in which fluid merely flows from the inlet port 35 through the valving 51 to the power beyond port 49. The valving also has a right turn position ("R") in which fluid flows from the inlet port 35 through the valving 51, and through a fluid meter 53, to the control port 41. The metered, pressurized fluid then flows through the conduits 45 and 31 to the steering actuator 17, to effect a right turn of the vehicle. Fluid exhausted from the actuator 17 flows through the conduits 33 and 47 to the control port 43, then through the valving 51 and out the return port 37 to the reservoir 12. Finally, the valving 51 also has a left turn position ("L") in which fluid flows from the inlet port 35 through the valving 51, and through the fluid meter 53, to the control port 43. The metered, pressurized fluid then flows through the conduits 47 and 33 to the steering actuator 17, to effect a left turn of the vehicle. Fluid exhausted from the actuator 17 flows through the conduits 31 and 45 to the control port 41, then through the valving 51 and out the return port 37 to the reservoir 12.

The fluid controller 19 includes some sort of manual input device, schematically designated 55, which would typically comprise a conventional steering wheel. Operably associated with the input device 55 is a sensor 57 the function of which is to transmit an electrical signal 59 (the signal line 59 being broken in FIG. 1, a part also being shown as an input to the ECU 23). The signal 59 is representative of the position (and possibly the rate of movement of) the input device 55, such that if the device 55 is a conventional steering wheel, the signal 59 indicates the instantaneous position, and possibly also the rate of rotation of the steering wheel, which is the input "command" to the steering system. Alternatively, the sensor 55 could be located to sense the position and rate of movement of the fluid meter 53, as is illustrated and described in co-pending application U.S. Ser. No. 09/780,802, filed Feb. 9, 2001 in the name of Don R. Draper, for a "Hydrostatic Steering System Having Improved Steering Sensing", also assigned to the assignee of the present invention and incorporated herein by reference.

The fluid controller 19 also includes some sort of biasing spring arrangement, shown schematically in FIG. 1 as comprising a pair of centering springs 61. However, as is well known to those skilled in the art of steering control units, the centering arrangement typically comprises a single spring set which is functionally operable to bias the valving 51 toward its centered, neutral position, from either the right turn position R or the left turn position L. Those skilled in the SCU art will understand that the present invention is not limited to any particular architecture or configuration of SCU, except to the extent specifically so noted hereinafter in the appended claims.

The electro-hydraulic control (EHC) valve 21 will now be described in some detail, to the extent necessary in view of the nature of the present invention. The EHC valve 21 can comprise two separate valves, each connected to the conduit 25, and each being in fluid communication with one of the conduits 31 or 33, at a location disposed between the steering control unit 19 and the steering actuator 17. However, as is shown herein, partly for simplicity, and partly because such is preferred, the EHC valve 21 can alternatively comprise a single 3-position, 4-way, flow control valve, defining a fluid inlet 63 connected to the conduit 25, and a fluid return 65, connected through the conduit 39 to the reservoir 12. The EHC valve 21 also defines a pair of outlets 67 and 69, the outlet 67 being in fluid communication with the conduit 31, and the outlet 69 being in fluid communication with the conduit 33.

As was explained previously, the function of the EHC valve 21 is to serve as a compensation valve, for example, to communicate pressurized fluid from the conduit 25 to either the conduit 31 or 33, as necessary, to "compensate" for a sensed error between the position of the manual input device 55 and the position of the steering actuator 17. In order to accomplish this compensation function, the EHC valve 21 is provided with a pair of solenoids 71 and 73, operable to bias the valve 21 to the right or to the left, respectively, in FIG. 1.

Associated with at least one of the output rods 29 of the steering actuator 17 is a sensor 75, the function of which is to generate a signal 77 indicative of the instantaneous position of the output rod 29, i.e., the steered wheel position. The signals 59 and 77 are both transmitted as inputs to the ECU 23 which, in a manner well known to those skilled in the art, will compare the signals 59 and 77 and calculate the amount of "error" between the two signals 59 and 77. The result of the error calculation will be the generation of a pair of output signals 81 and 83, which are then transmitted to the solenoids 71 and 73, respectively, as command signals to actuate the EHC valve 21 from its neutral position toward either of the operating positions of the valve 21 shown in FIG. 1.

By way of example, during a right turn (pressurized fluid communicated to the control port 41), if the steered wheel position signal 77 lags the steering wheel position signal 59, appropriate signals 81 and 83 will be generated to move the EHC valve 21 to the left in FIG. 1. As a result, pressurized fluid in the conduit 25 will be communicated from the fluid inlet 63, through the valve 21, to the outlet 67. Fluid in the outlet 67 will then flow into the conduit 31, joining fluid flowing from the control port 41, until the error between the signals 59 and 77 is "nulled" or eliminated, indicating that proper correspondence between the steering wheel and the steered wheels has been re-established.

In accordance with the present invention, and as was mentioned previously, what is normally considered as the "priority" device, i.e., the steering control unit 19, is connected to the excess flow outlet EF, while what is normally considered the "auxiliary" device, i.e., the EHC valve 21, is connected to the controlled flow outlet CF. During normal steering operation, with the LSPV biased by a spring 85 to the position shown in FIG. 1, fluid would all flow to the controlled flow outlet CF, but can't flow out of the outlet CF because the EHC valve 21 is centered, blocking flow. There is an internal pilot pressure line 87 teed off upstream of the outlet CF, and the pressure in the pilot pressure line 87 biases the LSPV 15 to the left in FIG. 1, so that at least some of the fluid output of the pump 13 flows to the excess flow outlet EF, and from there through the conduit 27 to the SCU 19 to achieve steering in the normal manner.

Whenever an error is sensed between the steering and steered wheel signals 59 and 77, as was explained previously, the EHC valve 21 is shifted to communicate some compensation fluid to or from one of the conduits 31 or 33, as necessary to null the error signal. As the EHC valve 21 begins to open and communicate fluid to either of its outlets 67 or 69, one of the outlets 67 or 69 will be at approximately steering system pressure, i.e., the pressure needed to move the steering actuator 17. The system pressure being sensed at the higher pressure of the two outlets 67 and 69, via a shuttle check valve assembly 88, is transmitted by a load sensing line 89 back to a load sensing port 91 of the LSPV 15, to bias the LSPV valve spool slightly to the right in FIG. 1, so that enough fluid is now communicated to the controlled flow outlet CF to enable the EHC valve 21 to achieve its compensation function described previously.

The primary benefit of the present invention occurs in connection with the steering "against-the-stops" condition described in the BACKGROUND OF THE DISCLOSURE. When the steering actuator 17 reaches its mechanical stop, but the steering wheel would continue to rotate because of operator manual input, the ECU 23 senses an incipient error condition as described previously. The ECU 23 generates appropriate output signals 81 and 83 to actuate the EHC valve 21 and provide the compensation fluid. By way of example, consider the sequence of events at a full right turn. A condition soon occurs in which the flow of pressurized fluid from the outlet CF through the EHC valve 21 to the conduit 31 causes the pressure in the conduit 31 to become equal to or greater than the fluid pressure in the conduit 27 which feeds the inlet port 35 of the SCU 19.

As the steering actuator 17 has already reached the limit of its travel, there is no place for additional fluid to flow, and therefore, the relief valve (not shown herein) of the pump 11 will open and divert flow back to the reservoir 12. At this point in the operation, the LSPV 15 has shifted back to the position shown in FIG. 1, directing all available pressure to the EHV valve 21 and blocking pressure to the SCU 19. The fact that the pressure in the conduit 31 downstream of the SCU 19 is greater than that at the inlet port 35 has the effect of resisting any further attempts by the operator to turn the steering wheel, in the same direction. As is well known to those skilled in the SCU art, turning the steering wheel in the condition described above forces the fluid meter 53 to act like a pump, generating a pressure proportional to the torque applied by the operator. As the downstream pressure, which is now at system relief valve pressure, is much greater than the pressure at the inlet port 35, the operator will be unable, by his own strength, to generate sufficient torque to rotate the steering wheel (the manual input device 55).

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A full fluid-linked steering system adapted to provide input movement to a pair of steered wheels of a vehicle, in response to manual input to a steering member, said steering system comprising a source of pressurized fluid, a fluid controller, and a fluid pressure operated actuator adapted to be operably associated with the pair of steered wheels to provide said input movement thereto in response to manual input to said steering member; said fluid controller defining an inlet port in fluid communication with said source of pressurized fluid, and a control port in fluid communication with said actuator, said fluid controller further including a fluid meter operable to measure fluid flow through said fluid meter, and valve means and means biasing said valve means toward a neutral position; said steering system further comprising compensation valve means in fluid communication with said source of fluid, and in fluid communication with said actuator, and including valving moveable in response to an external input signal to permit fluid communication between said source and said actuator; a load sensing priority flow control valve having an inlet connected to said source of fluid, a controlled flow outlet port and an excess flow outlet port; characterized by:
   (a) said compensation valve means includes a fluid inlet in direct fluid communication with said controlled flow outlet port of said priority flow control valve; and
   (b) said inlet port of said fluid controller being in direct fluid communication with said excess flow outlet port of said priority flow control valve.

2. A full fluid-linked steering system as claimed in claim 1, characterized by said fluid controller comprising controller valving, biased by centering springs toward a neutral position, but operable in response to movement of a manual input device to one of a right turn condition and a left turn condition.

3. A full fluid-linked steering system as claimed in claim 2, characterized by said fluid controller further comprising said fluid meter being operable, in response to the flow of fluid through said fluid controller to provide follow-up movement to said controller valving.

4. A full fluid-linked steering system as claimed in claim 1, characterized by said fluid pressure operated actuator comprising a linear steering cylinder including a pair of output rods adapted to provide steering movement to the pair of steered wheels.

5. A full fluid-linked steering system as claimed in claim 1, characterized by said load sensing priority flow control valve having a load sensing port, and said compensation valve means including means operable to generate a load signal representative of the steering load at said actuator, said load signal being received at said load sensing port and biasing said priority flow control valve toward a position tending to communicate all fluid from said inlet to said controlled flow outlet port.

6. A full fluid-linked steering system as claimed in claim 5, characterized by said load sensing priority flow control valve further including an internal pilot pressure line in fluid communication with said controlled flow outlet port and biasing said priority flow control valve toward a position tending to communicate all fluid from said inlet to said excess flow outlet port.

7. A full fluid-linked steering system as claimed in claim 1, characterized by said compensation valve means including an outlet in fluid communication with said actuator, said compensation valve means having a neutral position blocking fluid flow from said fluid inlet to said outlet, and an operating position permitting fluid flow from said fluid inlet to said outlet.

8. A full fluid-linked steering system as claimed in claim 7, characterized by said compensation valve means including a solenoid and being movable between said neutral position and said operating position in response to said external input signal being transmitted to said solenoid.

9. A full fluid-linked steering system as claimed in claim 8, characterized by said fluid pressure operated actuator including a sensor operable to generate a signal representative of steered wheel position; said steering system including a microprocessor and said fluid controller including a sensor operable to generate a signal representative of the position of said steering member, said microprocessor being operable to compare said signals, determine an error therebetween, and generate said external input signal to be generally proportional to said error.

* * * * *